United States Patent [19]

Ledjeff et al.

[11] Patent Number: 5,258,241
[45] Date of Patent: Nov. 2, 1993

[54] REBALANCE CELL FOR A CR/FE REDOX STORAGE SYSTEM

[75] Inventors: Konstantin Ledjeff, Bad Krozingen; Angelika Heinzel, Freiburg, both of Fed. Rep. of Germany

[73] Assignee: Siemens Aktiengesellschaft, Munich, Fed. Rep. of Germany

[21] Appl. No.: 450,547

[22] Filed: Dec. 14, 1989

[30] Foreign Application Priority Data

Dec. 22, 1988 [DE] Fed. Rep. of Germany ....... 3843312

[51] Int. Cl.$^5$ ............................................. H01M 8/06
[52] U.S. Cl. ...................................... 429/42; 429/44; 429/107; 429/109
[58] Field of Search ................. 429/42, 44, 107, 109

[56] References Cited

U.S. PATENT DOCUMENTS

| | | | |
|---|---|---|---|
| 3,756,860 | 9/1973 | Binder et al. | 429/42 |
| 4,382,116 | 5/1983 | Gahn et al. | 429/34 |
| 4,522,895 | 6/1985 | Shigeta et al. | 429/44 |
| 4,794,054 | 12/1988 | Ito et al. | 429/40 X |

FOREIGN PATENT DOCUMENTS 2549083 5/1977 Fed. Rep. of Germany .
1374125 11/1974 United Kingdom .

*Primary Examiner*—Stephen Kalafut
*Attorney, Agent, or Firm*—Kenyon & Kenyon

[57] ABSTRACT

The invention provides a rebalance cell for a Cr/Fe redox storage system. The rebalance cell has a catalyst for the reduction of $Fe^{3+}$ ions by means of hydrogen. The catalyst separates a gas chamber of the rebalance cell (holding hydrogen) and a liquid chamber of the rebalance cell (holding $Fe^{3+}$ electrolyte). The catalyst is in the form of an activated charcoal made hydrophobic and coated with a platinum metal, gold or silver. The catalyst can also be in the form of tungsten carbide made hydrophobic.

9 Claims, 1 Drawing Sheet

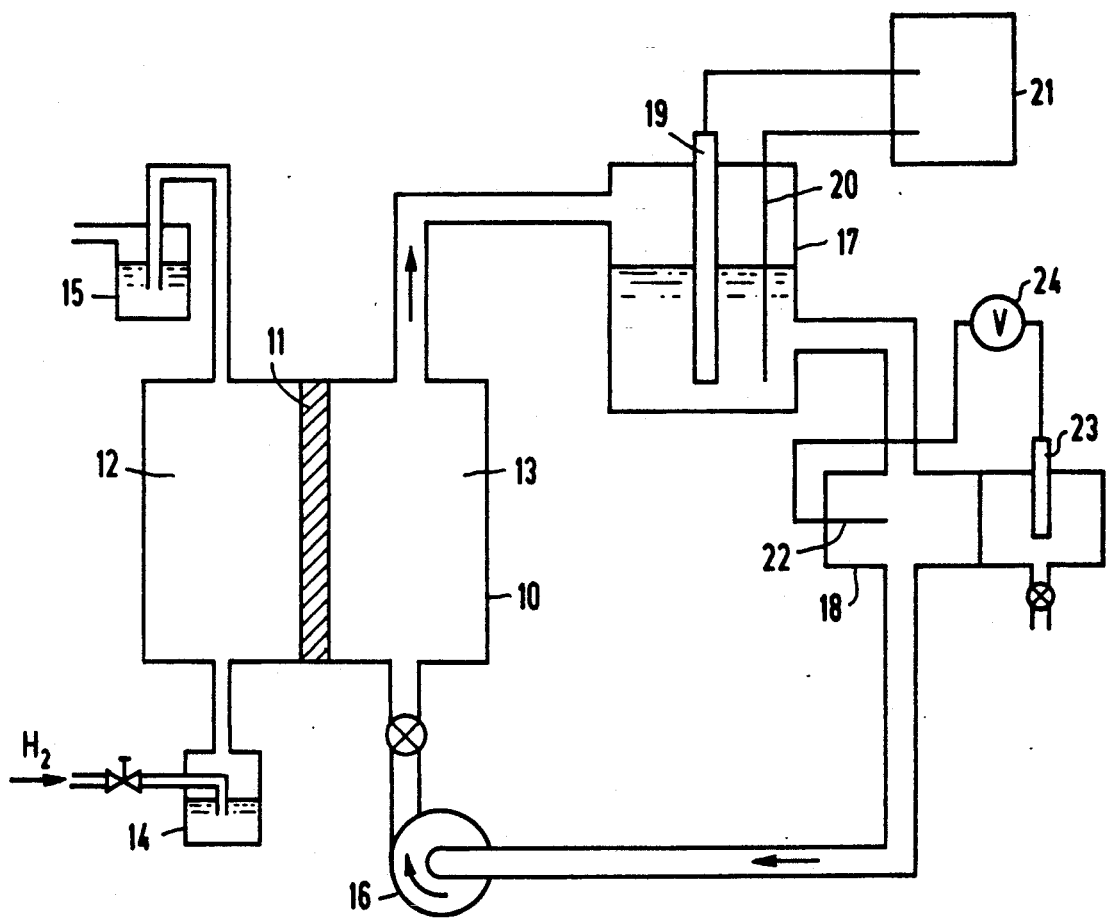

REBALANCE CELL FOR A CR/FE REDOX STORAGE SYSTEM

BACKGROUND OF INVENTION

1. Field of the Invention

The invention relates to a rebalance cell for a Cr/Fe redox storage system for the reduction of $Fe^{3+}$ ions by means of hydrogen.

2. Description of Related Art

Redox flow batteries can function for the storage of electrical energy. The energy storage herein takes place by means of solutions of metal ion pairs with different states of oxidation. If two such ion pairs whose oxidation-reduction potentials are sufficiently far apart are allowed to react at two different electrodes separated from each other by an ion-selective membrane, a potential (i.e., electric energy) is obtained (see for example EP 0 143 300).

Redox pairs of the above stated type are for example $Cr^{3+}/Cr^{2+}$ and $Fe^{3+}/Fe^{2+}$. In cells or batteries with such oxidation-reduction pairs (i.e., Cr/Fe redox cells or redox batteries), electrical energy is converted during charging into chemical energy through electrochemical reactions. The process is reversed on discharging. Therein the following processes occur:

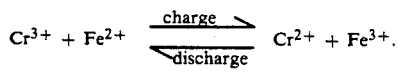

$$Cr^{3+} + Fe^{2+} \underset{\text{discharge}}{\overset{\text{charge}}{\rightleftharpoons}} Cr^{2+} + Fe^{3+}.$$

The oxidation-reduction reaction of the iron takes place at the positive electrode, that of the chromium at the negative electrode; for this purpose acidic electrolyte solutions are used, in particular hydrochloric acid solutions of iron chloride or chromium chloride.

While the charging reaction of the iron proceeds with nearly 100% current yield, in the reduction of $Cr^{3+}$ ions the production of hydrogen occurs as a side reaction during the charging process at the graphite electrodes utilized (see hereto for example U.S. Pat. No. 3,996,064 and U.S. Pat. No. 4,382,116 as well as EPO 0 312 875).

Thereby a marked difference with respect to the state of charge of the two electrolyte solutions exists after several charging and discharging processes of the battery. The imbalance of the states of charge consists therein in a higher state of charge of the iron electrolyte i.e. in an excess of $Fe^{3+}$ ions.

The difference between the state of charge of the chromium electrolyte and that of the iron electrolyte must be balanced with the aid of a special cell, a so-called rebalance cell through which the balance of the state of charge is again restored. This takes place in general through a reduction of $Fe^{3+}$ ions since a further reduction of $Cr^{3+}$ ions is connected to a poorer current yield.

The cathodic reduction of $Fe^{3+}$ ions can take place in different ways:

(1) electrochemically with anodic $Cl_2$ generation (as counter reaction);
(2) electrochemically with anodic $Br_2$ generation;
(3) electrochemically with anodic $H_2$ oxidation, i.e. consumption;
(4) chemically with hydrogen.

These reactions are accompanied, however, by different disadvantages.

In method (1) a separate anodic circuit is required since a development of chlorine in the redox cells is not desirable for reasons of stability of the different materials. In addition, the generated gases $H_2$ and $Cl_2$ must either be removed from the system or must be recombined to form HCl for balancing the substances. Moreover, method (1) as well as method (2) require electric energy for operating the rebalance cell specifically corresponding to the position of the potential of the different reactions.

In method (2) an addition of hydrogen bromide to the electrolyte is required which increases the electrolyte expenditure.

Method (3) would have the advantage that it supplies energy since the oxidation of hydrogen proceeds at approximately 0 V. However, thus far the technical realization of this method has not been successfully achieved.

Method (4) which involves the direct chemical reduction of $Fe^{3+}$ ions with the hydrogen generated at the chromium electrode, represents a favorable possibility for rebalancing the state of charge since during chemical balancing, in contrast to the electrochemical methods, an integration into the redox battery is possible whereby the structure is simplified and the energy efficiency of the system is improved. But the reaction rate of the reduction of $Fe^{3+}$ ions with hydrogen is low.

It is an object of the invention to implement a rebalance cell for a Cr/Fe redox storage system for the reduction of $Fe^{3+}$ ions by means of hydrogen such that this reduction is accelerated and hence a practical application of the chemical balancing system becomes possible.

SUMMARY OF THE INVENTION

The invention provides a rebalance cell for the reduction of the $Fe^{3+}$ ions which has a catalyst in the form of activated charcoal made hydrophobic and coated with a platinum metal, gold or silver or in the form of hydrophobized tungsten carbide. The catalyst separates a gas chamber for hydrogen from a liquid chamber for the $Fe^{3+}$ electrolyte. The use of a catalyst of the stated type allows for a suitable reduction of $Fe^{3+}$ ions with hydrogen so that the rebalance cell according to the invention can be applied for practical use in Cr/Fe redox storage systems. Moreover, this rebalance cell requires no energy expenditure because, apart from the pumping energy which is required in the electrochemical rebalance systems used until now, the electrical energy for the cell also becomes superfluous. In this manner an increase in the energy efficiency is achieved.

DETAILED DESCRIPTION OF THE INVENTION

The catalyst of the rebalance cell is either activated charcoal made hydrophobic and coated with a platinum metal, gold or silver, or tungsten carbide made hydrophobic. By "platinum metal" it is to be understood the elements of the eighth subgroup of the periodic system i.e. ruthenium, rhodium, palladium, osmium, iridium and platinum. For the process of hydrophobing (of the activated charcoal or the tungsten carbide) polytetrafluoroethylene is preferred. If tungsten carbide (made hydrophobic) is used as catalyst, it can additionally be coated with one of the cited metals i.e. with a platinum metal, gold or silver.

In the rebalance cell according to the invention the catalyst is preferably a mat of activated charcoal and polytetrafluoroethylene (PTFE) coated with platinum.

The catalyst mat therein contains activated charcoal and PTFE advantageously in a ratio between 60:40 and 40:60. The catalyst preferably contains approximately between 0.1 and 2 mg Pt/cm$^2$.

The catalyst mat can be produced from activated charcoal and PTFE powder by grinding together the components, and pressing and sintering them. The mat which is produced serves as a carrier. On this mat the catalyst is deposited. For this purpose the mat is preferably impregnated with a solution of a platinum salt, in particular H$_2$PtCl$_6$ in a water/methanol mixture. Subsequently, drying takes place and the platinum compound is reduced to elemental platinum by heating to approximately 200° to 250°C. in a forming gas stream i.e. in an H$_2$/N$_2$ mixture with a low H$_2$ portion. With a coating of approximately 0.2 mg Pt/cm$^2$ of geometric mat surface, the maximum reaction rate of the Fe$^{3+}$ reduction is nearly achieved.

The invention will now be explained in greater detail with reference to the following example and the accompanying figure.

EXAMPLE

In a test stand the reaction rate of the conversion of gaseous hydrogen with a solution of FeCl$_3$ in hydrochloric acid (1 M FeCl$_3$, 3 M HCl) or with a so-called mixed electrolyte (1 M FeCl$_3$, 1 M CrCl$_3$, 3 M HCl) was investigated using a hydrophobic activated charcoal mat coated with platinum. In a redox battery mixed electrolytes are used if the solutions of the metal salts in the cells are separated from each other by a cation exchange membrane (cation exchange membranes are less selective than anion exchange membranes with respect to the separation of chromium and iron ions). Mixed electrolytes have the advantage that the concentration gradient is strongly reduced so that the intermixing of anolyte and catholyte proceeds significantly slower.

As shown in FIG. 1, the test stand has a rebalance cell 10 which is divided by a catalyst mat 11 into a gas chamber 12 for hydrogen and a liquid chamber 13 for the Fe$^{3+}$ eleotrolyte. The catalyst mat 11 is advisably provided on both sides with a support mesh which is not shown in the Figure. The gas chamber 12 is supplied with hydrogen via a bubble counter 14; the excess hydrogen leaves the gas chamber 12 via a bubble counter 15.

The electrolyte, i.e. the Fe$^{3+}$-containing solution, is conducted by means of a pump 16 in a circuit through the liquid chamber 13 of the rebalance cell 10, a storage vessel 17 and a so-called indicator cell 18. Between the gas chamber 12 and the liquid chamber 13 a significant differential pressure must therein be avoided since the separation effect of the porous catalyst mat 11 rests solely on its hydrophobic property. To improve the separation effect, the catalyst mat 11 can be provided advantageously on the gas side with a porous hydrophobic foil or film, in particular with a porous PTFE film. This film preferably has a thickness of approximately 5 to 50 um.

The storage vessel 17 has a heating device 19, for example an immersion heater, and a thermoelement 20 which are connected to a temperature controller 21. The indicator cell 18 is provided with a platinum wire 22 and a reference electrode 23, for example in the form of a calomel electrode, which are connected to a voltmeter 24.

On examining the catalytic efficiency of the catalyst mat it was found that a complete reduction of the Fe$^{3+}$ ions to Fe$^{2+}$ ions (by means of hydrogen) is achieved; the reduction can be followed by measuring the potential. It was further discovered that the conversion is a function of the concentration of the Fe$^{3+}$ ions; therein the separated as well as also the mixed electrolyte show the same reaction rate. Moreover, it was found that the conversion increases in direct proportion to the area of the catalyst mat.

In calculating the conversion, some specific properties of a redox battery must be taken into consideration, namely:

the hydrogen production starts beginning at approximately 60% of the state of charge of the chromium electrolyte;

the maximum state of charge of the battery is 80%, the minimum state of charge is 20%;

approximately 5% of the charge current is consumed in the production of hydrogen.

The conversion is 5% of the charge current and must take place in 20% of the charge time, and specifically between 60 and 80% of the state of charge of the battery. For a storage capacity of 1 kilowatt-hour, given such an operating method of the battery, 60 l of each electrolyte solution are required. With a charge time of the battery of 5 h, a conversion of 1.87 moles Fe$^{3+}$ in the rebalance cell is required in the last hour of the charge time. This conversion can be achieved at an area of 1000 cm$^2$. With this constellation the battery must have a power of at least 200 watts which corresponds to an electrode area of 8000 cm$^2$.

What is claimed is:

1. A rebalance cell for a Cr/Fe redox storage system for the reduction of Fe$^{3+}$ ions by means of hydrogen, comprising a gas chamber for hydrogen, a liquid chamber for Fe$^{3+}$ electrolyte, and a catalyst for the reduction of Fe$^{3+}$ ions, wherein said catalyst separates said gas chamber and said liquid chamber, and wherein said catalyst is in the form of hydrophobized activated charcoal coated with a metal selected from the group consisting of ruthenium, rhodium, palladium, osmium, iridium, platinum, gold and silver.

2. The rebalance cell according to claim 1, wherein the catalyst is a mat of activated charcoal and polytetrafluoroethylene coated with platinum.

3. The rebalance cell according to claim 2, wherein the mat contains activated charcoal and polytetrafluoroethylene in a ratio of between 60:40 and 40:60.

4. The rebalance cell according to claim 2, wherein the catalyst contains from about 0.1 to about 2 mg Pt/cm$^2$.

5. The rebalance cell according to claim 2, wherein the catalyst mat has a side facing the gas chamber which is provided with a porous hydrophobic film.

6. The rebalance cell according to claim 3, wherein the catalyst contains from about 0.1 to about 2 mg Pt/cm$^2$.

7. The rebalance cell according to claim 3, wherein the catalyst mat has a side facing the gas chamber which is provided with a porous hydrophobic film.

8. The rebalance cell according to claim 4, wherein the catalyst mat has a side facing the gas chamber which is provided with a porous hydrophobic film.

9. A rebalance cell for a Cr/Fe redox storage system for the reduction of Fe$^{3+}$ ions by means of hydrogen, comprising a gas chamber for hydrogen, a liquid chamber for Fe$^{3+}$ electrolyte, and a catalyst for the reduction of Fe$^{3+}$ ions, wherein said catalyst separates said gas chamber and said liquid chamber, and wherein said catalyst is hydrophobized tungsten carbide.

* * * * *